Sept. 20, 1971   R. M. FISHER   3,605,808
IN-LINE EXTERNALLY ADJUSTABLE FLOW CONTROL
AND NEEDLE VALVE ASSEMBLY
Filed June 23, 1969

ROBERT M. FISHER
INVENTOR.

BY Norman L. Chaffin
AGENT

United States Patent Office 3,605,808
Patented Sept. 20, 1971

3,605,808
IN-LINE EXTERNALLY ADJUSTABLE FLOW CONTROL AND NEEDLE VALVE ASSEMBLY
Robert M. Fisher, 20966 Los Flores Mesa Drive,
Malibu, Calif. 90265
Filed June 23, 1969, Ser. No. 835,588
Int. Cl. F16k 15/18
U.S. Cl. 137—599.2                    2 Claims

ABSTRACT OF THE DISCLOSURE

A compact in-line flow-control valve and needle valve assembly is disclosed wherein an externally adjustable needle valve element is adjustable to permit a predetermined restricted flow in both directions or may include a spring-loaded ball assembly by which flow is restricted in one direction with free-flow thru ball assembly when flow is reversed.

BACKGROUND OF THE INVENTION

The invention disclosed herein is an improvement over my valve disclosed in co-pending application Ser. No. 673,355 filed Oct. 6, 1967, now Pat. No. 3,527,441 and entitled "External Valve Adjustment Means." In the above-identified application the valve disclosed included an adjustable external barrel engaged with a partial screw with flat, parallel sides which ride in diametrally opposed guide grooves in the valve body linearly as the barrel is rotated. A seating element is pushed along by the partial screw against a resilient pressure to adjust the flow aperture.

THE PRESENT INVENTION

In the present invention an outer sleeve engages inlet and outlet adaptor nipples. One of the nipples includes a valve seat and internal threads which engage a needle valve body; the other nipple in the opposite end of the valve assembly from the first nipple provides an abutment for a needle valve unit. The needle valve unit is moved longitudinally within the sleeve in a hexagonal broached bore by the rotation of the valve body by the sleeve. The valve element has an external hexagonal configuration mating with the bore in the sleeve over the rear portion thereof. The forward portion is tapered to seat in the valve seat at the extreme thereof and threaded further back to be engaged with said threads in the valve body. An internal bore in the needle valve element provides flow thru path or may have therein a spring-loaded ball so that check valve operation may be achieved therewith. By the nipples the valve assembly may be inserted in the line and adjustment can be made while the unit is in the line by rotating the outer sleeve. The adjustment can also be made in hand with the valve assembly off the line, and thereafter installed in the line in which flow control is desired.

The invention is described in the specification which follows and is illustrated in the accompanying drawings in at least two embodiments. These should not be construed to limit the invention to the illustrative embodiments since those skilled in the arts pertinent to the invention will be able to devise other embodiments in view of the disclosure and the teachings herein within the ambit of the claims which are appended.

Figure 1:
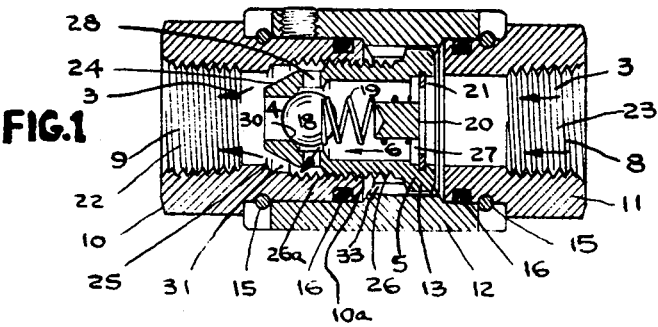
FIG. 1 is a longitudinal cross-section through a valve assembly according to this invention with restricted flow through a variable orifice.
Figure 5:
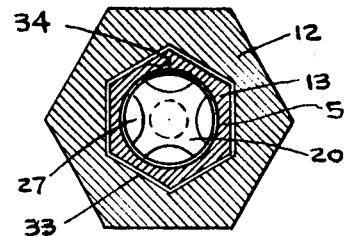
FIG. 5 is a lateral cross-section through the valve shown in FIG. 2 at 5—5.
Figure 6:
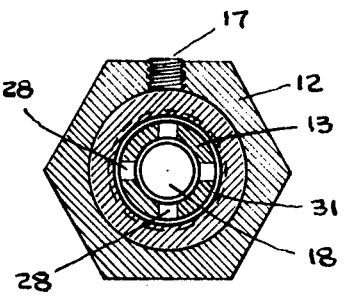
FIG. 6 is a lateral cross-section through 6—6 of FIG. 2.

In FIG. 1 a valve according to the invention is shown in longitudinal cross-section. It is also shown in other positions of its operational characteristics in FIGS. 2 and 3. In each of these figures and in the cross-section of FIGS. 5 and 6 the elements identified by reference characters in FIG. 1 and repeated in the other figures bear the same reference characters in these other figures.

The valve shown in FIGS. 1–3 and 5 and 6 includes a valve body 10 having a central bore therethrough at 9 threaded internally 22 to a depth sufficient to permit coupling of the body as a nipple onto a fluid flow line, or a gas line. Body 10 is held tightly in a sleeve 12 by a retaining ring 15 and sealed to sleeve 12 by O ring 16. Within body 10 a valve seat 25 is cut in bore 9 and an inner thread 26a, larger in diameter than valve seat 25 is cut in the inner end of valve body 10a. A nipple 11 has a central bore 8 threaded at 23 similarly to that at 22 in body 10. Nipple 11 is retained in sleeve 12 by retaining ring 15 and sealed by O ring 16.

A check valve body 13 having a tapered nose 24 is inserted in bore 9 with nose 24 pointing into valve seat 25. The check valve body is threaded on the rear portion of its outer diameter as can be seen at 26. The check valve body 13 is machined from hexagonal bar stock so that the rear end thereof remains hexagonal in shape to interfit hexagonally broached bore 33 in sleeve 12 so the body 13 may move longitudinally on its hexagon end 5 in sleeve 12 without twisting when sleeve 12 is rotated. Between threads 26 and the tapered nose 24 of body 13 cross bores are drilled normal to one another as may be more clearly seen in FIG. 6. In the hexagonal end 5 of body 13 a washer 20 of arcuate shape to provide flow apertures 27, which may be more clearly seen in FIG. 5, when body 13 is inserted in sleeve 12. There is a central bore 6 in body 13 drilled from the hexagonal end 5 thereof. A smaller bore 4 is made from the tapered nose end 24. Bores 6 and 4 are in communication through body 13. Within bore 6 a ball 18 is positioned near bore 4. A spring 19 presses against ball 18 with its remote end abutting washer 20 held in bore 6 at a fixed location by snap ring 21 at the rear of body 13. The ball 18 is urged againset seat 30 in bore 4 by the resilience of spring 19 tending to expand between ball 18 and washer 20.

In the direction indicated by arrows 3 fluid or air flow will pass through inlet bore 8 through flow apertures 27 pass spring 19 around ball 18 and out through cross bores 28 and around tapered nose 24 through bore 9. The tapered nose 24 it should be noted in FIG. 1 is not seated on seat 25 so that all flow through bore 6 will be under pressure from bore 8 to bore 9.

Figure 2:
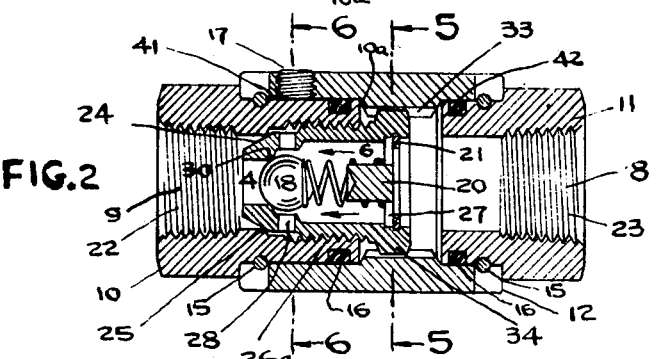
FIG. 2 is a longitudinal cross-section through a valve like that in FIG. 1 with the orifice closed.

Compare this with the arrangement illustrated in FIG. 2 where the nose 24 seats on seat 25. While there is flow under pressure into bore 6 from bore 8 there can be no flow from bore 8 towards bore 9.

The difference in position of body 13 as illustrated open in FIG. 1 and closed against seat in FIG. 2 is accomplished by rotating sleeve 12 so that it turns body 13 by the mating hexagon end 5 with broached mating hexagon socket 33. Threads 26 on body 13 thread into mating thread 26a on body 10 and nose 24 seats on seat 25. One full turn of the sleeve 12 produces about .036 inch longitudinal movement of body 13. This results in approximately .001 inch movement per 10 degrees rotation of sleeve 12.

Figure 3:
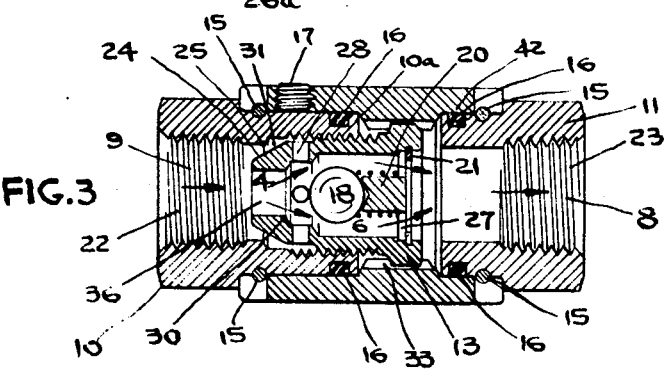
FIG. 3 is a longitudinal cross-section as in FIGS. 1 and 2 showing the flow path open to reverse flow freely through the check valve components thereof.

In FIG. 3 it can be seen that on reverse flow the incoming fluid or gas under pressure will force ball 18 away from seat 30 in body 13 allowing flow from bore 9 through bore 4 around ball 18 through bore 6 and flow apertures 27 to bore 8. This flow is in addition to any flow through bores 28.

Figure 4:
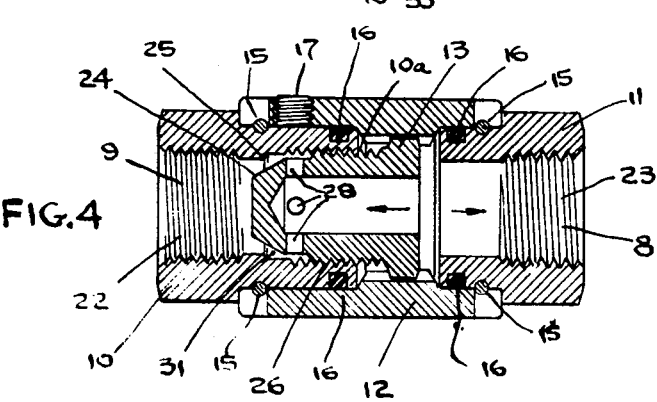
FIG. 4 is a longitudinal cross-section through a valve assembly showing a needle valve element according to the invention with provisions for restricted flow in both directions.

In FIG. 4 the needle valve arrangement of a valve according to the invention is shown. The body 13 used without a ball and spring and eliminating bore 4 becomes a needle valve element. The rate of flow either through the path of bores 8 and 9 or 9 and 8 depends upon the nose 24 being separated from seat 25 which is accomplished by rotating sleeve 12 as previously described. Sleeve 12 is held in place by setscrew 17 to maintain setting previously made. Sleeve 12 has round bores at opposite ends to the portion of depth shown at 41 and 42. The remainder of sleeve 12 is the hexagon bore 33.

I claim:
1. A flow control valve comprising:
   a sleeve having a central round bore from opposite ends thereof to predetermined depths within said sleeve, and a hexagonal bore within said sleeve, centrally in line with said round bores between said opposite ends, said hexagonal bore being on a common axis with said round bores;
   a valve body disposed in one of said round bores and a nipple being disposed in the other of said round bores, said valve body and said nipple being retained in said sleeve by respective retainer rings and sealed against leakage by O rings, said rings being disposed between the inner surface of said bores and the outer surfaces, respectively, of said body and said nipple;
   the end of said valve body being retained within said sleeve being internally bored and threaded, the center of said body having a valve seat communicating with said internal bore and having an internal thread at the opposite end thereof for attachment of said flow control valve to an external fluid line;
   said nipple being threaded internally for attachment to another flow line so that fluid may communicate and flow from said first named line to said second named line and vice versa; and
   a check valve having an external thread engaged in the thread in said internally threaded bore of said valve body, having a tapered end to be seatable in said valve seat when said check valve body is moved on said threads of said valve body and the end of said check valve body opposite said tapered end having a hexagonal configuration so as to interfit the hexagonal bore of said sleeve to be retained therein without twisting and to be rotatable with said sleeve;
   a spring-loaded ball within said check valve body being interposed between said valve seat and the hexagonal end of said check valve body, said ball being urged forward by the spring load thereof to close off a bore in said check valve body at the tapered end thereof, there being cross bores in said tapered end thereof communicating with the center of said check valve behind said ball to permit flow when said tapered end is not seated into said seat in said valve body;
   whereby said sleeve may be rotated and to rotate with it said check valve body to move said check valve body towards and away from said seat to permit or prevent flow through said valve in varying degrees depending on the distance of said check valve tapered end from said seat.

2. A flow-control valve comprising:
   a sleeve having a hexagonal bore centrally disposed therein and end bores extending outwardly from either side of said hexagonal bore all said bores in said sleeve being in-line and in communication with one another;
   a nipple in one said end bore fixedly held therein;
   a valve body in the opposite end bore;
   a check valve assembly in said valve body and positioned in said valve body so as to interfit said hexagonal bore, said check valve body having a hexagonal end so as to be slidable in said hexagonal bore;
   threaded guide means on said check valve body and on said valve body in engagement with one another so that rotation of one with respect to the other will produce movement of said check valve body with respect to said valve body;
   closure means within said check valve body being normally urged to a closed position therein; and
   fluid communication bores in said check valve body to permit flow about said closure means and through said check valve body when said check valve body is open with respect to said valve body, the rate of flow being settable by the adjustment of said sleeve to rotate check valve body within said valve body.

References Cited

UNITED STATES PATENTS

| 904,134 | 11/1908 | Kilbourn | 251—340 |
| 2,813,545 | 11/1957 | Garnik | 137—599.2 |
| 2,999,512 | 9/1961 | Barkow | 251—340X |
| 3,303,746 | 2/1967 | Schmoeger | 137—599.2X |

FOREIGN PATENTS

| 655,024 | 12/1937 | Germany | 251—340 |

ROBERT G. NILSON, Primary Examiner

U.S. Cl. X.R.

251—340